May 17, 1927.
L. CARTER
HARVESTER
Filed July 27, 1923    3 Sheets-Sheet 3
1,628,948
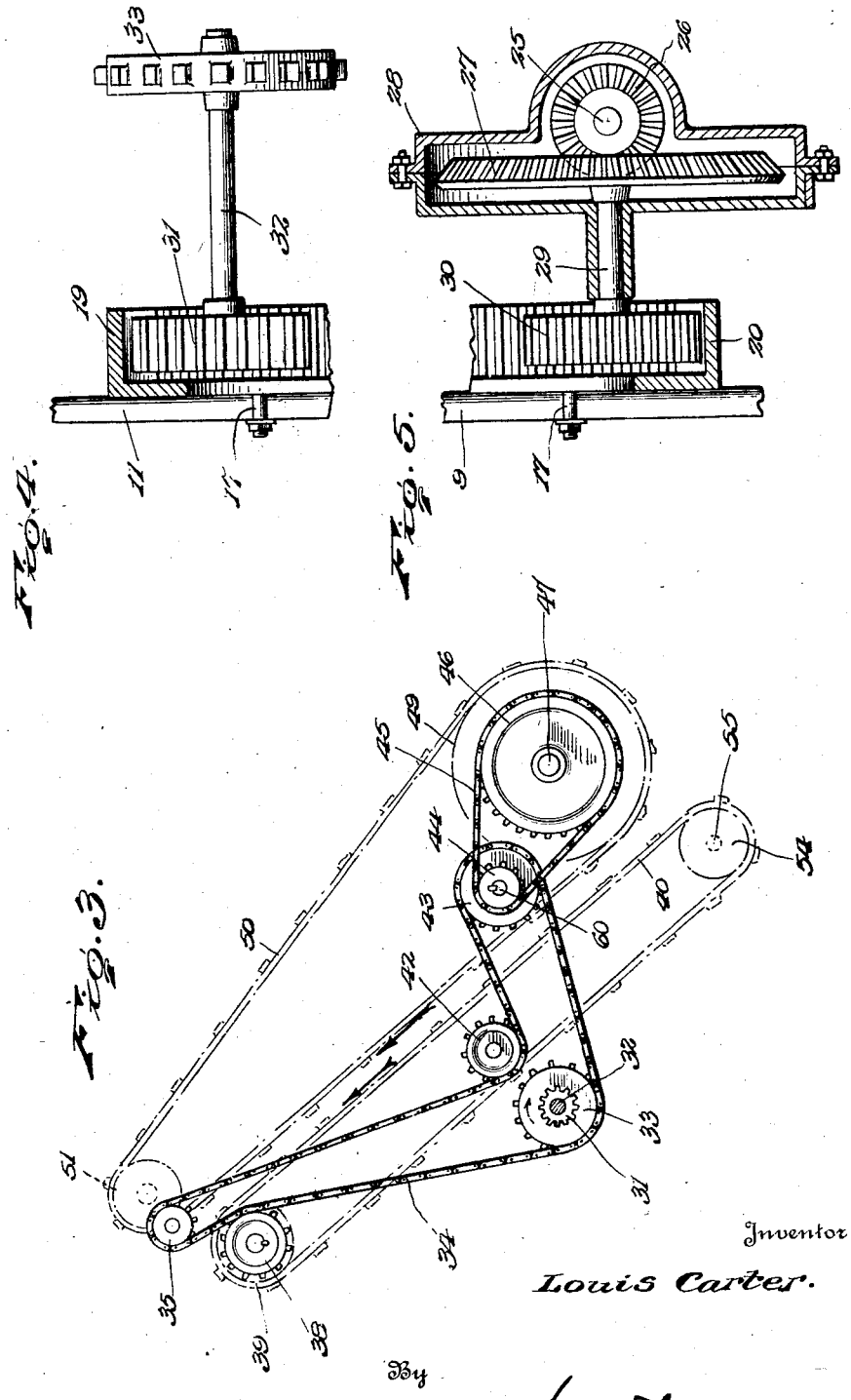
Inventor
Louis Carter.
By
Lacy & Lacy, Attorneys Patented May 17, 1927.

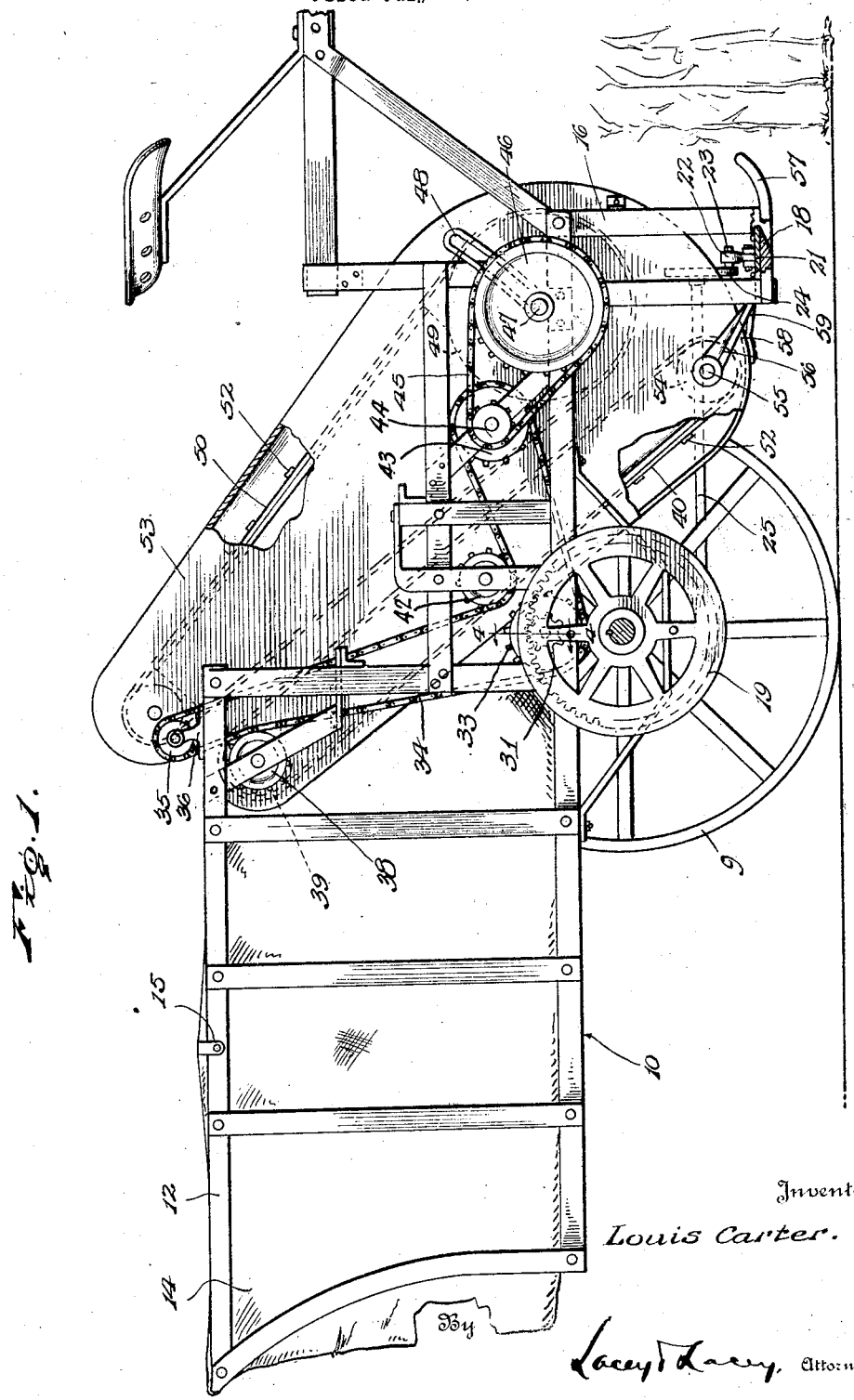

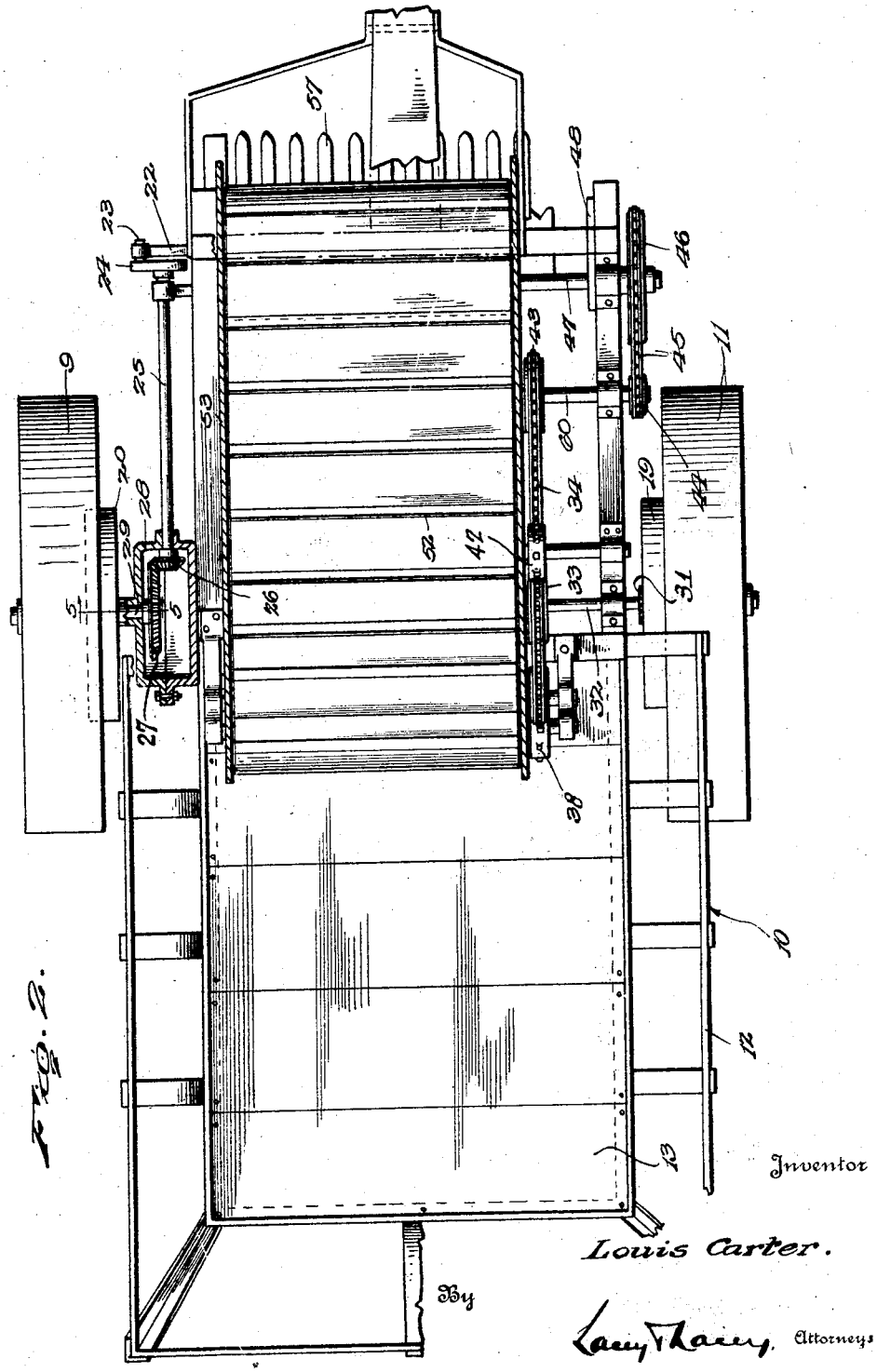

1,628,948

UNITED STATES PATENT OFFICE.

LOUIS CARTER, OF MARSTON, NORTH CAROLINA.

HARVESTER.

Application filed July 27, 1923. Serial No. 654,228.

My invention relates to harvesters mainly intended for harvesting cow peas but applicable to harvesting any other vegetable or grain growing on higher or shorter stalks. The main object of the invention is not only to cut the pea vines, but to convey the same after cutting to be collected in suitable bags or sheets, which is all done by the harvester when driving it along the ground.

The pea harvester works to its greatest advantage when the peas are planted in rows, but it will also harvest peas planted promiscuously or growing in a mat over the field.

The harvester consists of a wheeled cart or wagon provided with the usual reciprocating cutting knives which form no part of the present invention. Adjacent to the knives is a pair of parallel conveyer belts, between which the cut pea vines are conveyed upwardly and delivered into the body of the cart or wagon. In this wagon is deposited one or more canvas sheets, preferably a plurality of sheets one on top of the other, to receive the peas. When the top sheet is filled with peas, it is gathered together and removed from the body, whereupon the next canvas sheet will be ready for collecting the next harvested peas delivered by the conveying belts. In this manner, the harvester proceeds along the field, pulled by horses or a tractor, without stopping until the entire field has been cut as no change is required but the removal of the filled sheet or sheets.

One object of the invention is now to provide suitable transmission for reciprocating the knives and running the conveyer belts, all being actuated from the wheels of the cart or wagon.

In the accompanying drawings, one embodiment of the present invention is illustrated; and—

Figure 1 shows a side elevation and partial section of the cart containing the harvesting appliance of this invention the near ground wheel being removed;

Figure 2 is a top plan view of Figure 1 in partial section;

Figure 3 is a diagrammatic representation of the drive or transmission for the conveyer belts;

Figure 4 is a section along line 4—4 of Figure 1; and

Figure 5 is a section along line 5—5 of Figure 2.

In the drawings, reference numeral 10 represents a cart mounted in the usual manner on an axle 10' and wheels 9 and 11. The cart is preferably built with a crate-like receptacle 12, having a solid bottom 13. In this crate or body portion is deposited one or more canvas sheets 14 resting on the bottom and reaching up on all four sides of the crate-like body of the wagon. The top edges of the canvas sheets may be secured in any suitable manner along the top edges of the crate 12, as by snaps or hooks 15, so as to be readily removed when filled.

The cart has a forward frame-like extension 16 for carrying the harvesting knives and gearing and the operator's seat, and to each of the wheels 11 and 9 is bolted, as at 17, an internal spur gear 19 and 20 respectively.

The harvesting knives consist of a stationary blade 18 and a reciprocating blade 21, both provided with pointed teeth in the usual manner and supported at the lower forward end of the frame 16. An arm 22, provided at one end of the reciprocating blade, engages with a crank pin 23 on a disk 24, which is rigidly mounted on a shaft 25 revoluble in the frame of the cart. The rear end of the shaft 25 carries a beveled pinion 26 engaging with a bevel gear 27, both mounted in a suitable casing 28, rigidly mounted in the frame. The bevel gear 27 has a spindle 29 carrying, at its outer end, a spur pinion 30 engaging with the internal teeth of the gear 20 mounted to revolve with the wheel 9 when the cart is being propelled.

The drive for the belts consists of the other internal gear 19 mounted on the wheel 11 and engaging with a pinion 31 carried on a shaft 32 revolubly mounted in the frame. The other end of this shaft carries a sprocket wheel 33. This sprocket wheel 33 drives a chain 34, which runs over an idler 35 mounted in a bracket 36 which is secured on top of the crate 12 in such a manner that the idler 35 and its bracket 36 can be adjustably secured in longitudinal direction of the crate, in this manner making it possible to take up any slack in the chain 34. Before reaching the idler 35, the chain engages with the driver sprocket 38 mounted in the frame and secured on the same shaft as the drum 39, over which the lower belt 40 is mounted to run. The lower end of the conveyer belt 40 engages with another drum 54 carried on the shaft 55 mounted in bearings 56 secured on the frame 16. From the driver sprocket wheel 38, the chain 34 proceeds in engagement with the idler sprocket 35, whence it runs downwardly engaging a third idler 42 and finally around the sprocket 43 and then back to the sprocket 33, forming a continuous chain.

On the same shaft 60, upon which the sprocket 43 is rigidly mounted, is keyed a small pinion 44 which engages by means of a second chain 45 with a large sprocket wheel 46. The shaft 47 for the latter is adjustably clamped in arched guides 48, in order to take up any slack in the chain 45. This shaft also carries a drum 49 driven by the sprocket wheel 46 and around which the upper conveyer belt 50 is run, as well as around the idler drum 51 at the top of the cart.

It will now be understood that when the harvester is running forward, the two adjacent inner sides of the belts 40 and 50 will run upwardly in the same direction. This is caused by the wheel 11 running in clockwise direction together with the internal gear 19 and the pinion 31, thus turning, through the intermediary of the chain 34, the driver 38 revolving the same in counter-clockwise direction, so that the inner side of the belt 40 proceeds upwards.

As the sprocket 46 and the drum 49 run clockwise, see Figure 3, actuated by the chain 45, pinion 44 and sprocket 43, which also run clockwise, the inner or under side of the large belt 50 will also run upwardly or in the same direction as the adjacent side of the belt 40.

The two belts are provided with transverse slats 52 and both are enclosed in a casing 53, as best seen in Figures 1 and 2.

In advance of the harvesting knives 18 and 21 are carried a plurality of gathering fingers 57, which are intended to collect the pea vines and guide them in between the knives. The bottom of the casing 53 is provided with an opening, as at 58, to admit the cut pea vines into the casing adjacent to the conveyer belts. In order to facilitate the transit of the peas from the knives to the belt, the guide plate 59 is fastened under this opening and extends forward to a level with the top face of the reciprocating knife 21. In this manner, the cut pea vines will fall upwardly on this plate and into contact with the conveyer belt 40, which then, assisted by the upper belt 50, will carry the cut pea vines to the upper end of the belt 40 and dump them down upon the sheet 14 in the crate of the cart.

It is evident that minor changes may be made in the construction of the harvester without deviating from the subject matter of the invention and the scope of the claim.

Having thus described the invention, what is claimed as new is:

A harvester comprising a frame having a forward depending portion, an axle intermediate the ends of the frame, wheels at the ends of the axle, an upwardly and rearwardly inclined casing at the front of the frame having its lower end close to the ground and open and provided in opposite sides with arcuate slots, said casing being entirely enclosed with the exception of the entrance at the lower end and a discharge at the upper end, cutting and gathering mechanisms at the lower end of the depending portion of the frame opposite the opening of the casing, upper and lower conveyer belts completely housed within the casing to receive the harvest from the cutting mechanism and deliver it through the upper end of the casing, the lower end of the upper conveyer being supported on a shaft which is adjustable in the said arcuate slots, drive mechanism for the conveyers disposed at one side of the casing and connected to one of the wheels, and drive mechanism for the cutting mechanism located at the opposite side of the casing and connected to the other wheel, both drive mechanisms being independent of each other and disposed exterior of the casing.

In testimony whereof I affix my signature.

LOUIS CARTER. [L. S.]